United States Patent [19]

Pavlecka

[11] 4,208,027
[45] Jun. 17, 1980

[54] GRADATION OF SKIN THICKNESS ON METAL-CLAD AIRSHIP HULLS

[75] Inventor: Vladimir H. Pavlecka, Newport Beach, Calif.

[73] Assignee: Airships International, Inc., Tustin, Calif.

[21] Appl. No.: 932,223

[22] Filed: Aug. 9, 1978

[51] Int. Cl.² ............................................. B64B 1/14
[52] U.S. Cl. ................................. 244/126; 244/132
[58] Field of Search ............... 244/30, 119, 125, 126, 244/131, 132, 133; 114/79 R, 79 W, 88

[56] References Cited

U.S. PATENT DOCUMENTS

| 1,648,630 | 11/1927 | Upson | 244/125 |
| 1,763,835 | 6/1930 | Upson | 244/30 |

*Primary Examiner*—Charles E. Frankfort
*Attorney, Agent, or Firm*—Christie, Parker & Hale

[57] ABSTRACT

A construction of the external skin of the hull of a metal-clad airship utilizing sections of hull plating of different thickness to connect the sheets or gores of the plating of the main portion of the hull to the base skin of structural members, such as external longerons and internal frame members.

5 Claims, 3 Drawing Figures

GRADATION OF SKIN THICKNESS ON METAL-CLAD AIRSHIP HULLS

CROSS-REFERENCE TO RELATED APPLICATIONS

This application is related to the following companion applications directed to various aspects of metal-clad airships:

Ser. No. 932,221, filed of even date herewith and entitled "Metal-Clad Airship Hull Construction";

Ser. No. 932,222, filed of even date herewith and entitled "Gas Cells for Metal-Clad Airships";

Ser. No. 932,131, filed of even date herewith and entitled "Apparatus for Attaching Fabric to Walls"; and Ser. No. 932,286, filed of even date herewith and entitled "Apparatus and Method of Assembly of an Airship Hull".

The subject matter and the disclosure of the foregoing applications are incorporated herein by reference.

DESCRIPTION OF THE PRIOR ART

The present invention relates to metal-clad airships and, in particular, to a structure for attaching the skin of a metal-clad airship to the structural framework elements of the hull of the ship.

As disclosed in copending application, Ser. No. 932,221, filed of even date herewith, the construction of a metal-clad airship hull is described therein. In essence, the hull design utilizes primary circular frame members disposed transversely of the hull of an elongated airship as the principal transverse support elements for the structure. To aid in the construction phase of a hull and also to contribute structural rigidity during emergencies, if a leak in the hull is encountered, secondary frame members of a similar configuration to the primary frame members are located intermediate the primary frame members. These secondary frame members are likewise circular, rigid elements transversely arranged to the axis of the hull and both the primary and secondary frame members, are attached to longitudinal girders (longerons) which overlie rather than intersect the concentrically-arranged transverse frame members such that the circular frame members are located internally of the hull, and the longitudinally-extending longerons are located externally of the hull. The skin or plating of the hull is attached to the frame members and longerons in the spaces defined between the intersection of the elements.

As is likewise discussed and illustrated in the above copending application, the frame members, primary and secondary as well as the longerons, are triangular in cross-section and consist of an apex cornice and two base cornices interconnected by a corrugated web defining the sides of the triangle and extending between the apex and respective cornices. Across the base of the triangle is a base skin to which the corner cornices are bonded and riveted. To provide the desired structural strength and integrity to the frame members and longerons, the base skin is of a predetermined thickness substantially greater in relative terms than the optimal thickness of the skin or surface of the main portions of the metal-clad hull. In addition, because the main portion of the hull skin is thin, it is subject to greater elastic deformation than the base skin of the frame members to which it is attached. To offset this deformation tendency, the preferred greater thickness of the base skin of the frames is two to three times thicker than the hull skin.

SUMMARY OF THE PRESENT INVENTION

The present invention provides a structural relationship for the external skin of the hull of a metal-clad airship to further improve the elastic slope in the longitudinal direction. This is accomplished by providing a skin of intermediate thickness interposed between the thick skin of the base of the framing members and the longerons and the thin hull skin.

The invention provides an apparatus for joining structural framing and reinforcing members of a metal-clad airship hull to the main skin portion of the hull. The apparatus comprises at least one intermediate section of hull material of a predetermined thickness secured between the skin portion forming the base of the framing and reinforcing members and the main skin portion of the hull, the thickness of the intermediate section being such that it is intermediate the thickness of the base skin portion and that of the main skin portion.

The advantage of the present invention is that the pattern of hull plating according to the present invention achieves the least variation of slope of the elastic deformation curve when the hull is under pressure. Where the elastic deformation of the hull structure is essentially uniform in all locations, the optimal design has been arrived at. In this way, the pressurization of the hull and any changes of pressure do not cause deformation or discontinuity in the hull skin, thus interfering with the curvature designed into the hull to achieve low friction-drag.

DESCRIPTION OF THE DRAWING

These and other advantages of the invention will be better understood by reference to the drawing, wherein.

DESCRIPTION OF THE SPECIFIC EMBODIMENT

Figure 1:
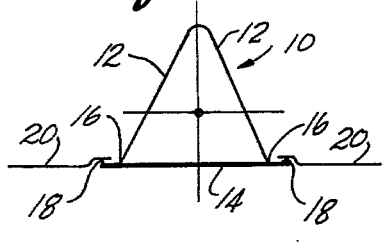
FIG. 1 is a cross-sectional view of an interior section of the hull of a metal-clad airship according to the prior art.

In the prior art construction of metal-clad airship hulls, internal frame members such as member 10 shown in FIG. 1 are constructed of a triangular configuration having sidewalls 12 and a base skin 14. The base skin 14 extends in both directions beyond the line of intersection of the sidewalls and the base of the triangle at the corner cornices 16 to a predetermined distance beyond the edge of the frame member. These extensions provide a lip 18, providing a convenient shelf or platform for connection of the sheets of metal 20 constituting the skin of the hull of the airship.

Figure 2:
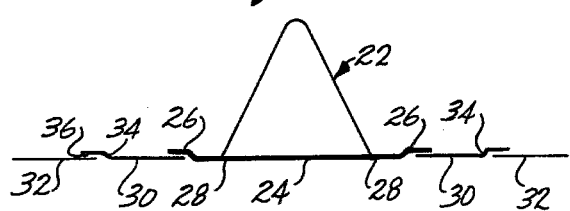
FIG. 2 is a cross-sectional view of an interior section of the hull of a metal-clad airship according to the present invention showing an intermediate skin between the base skin of a frame member and the thin main hull skin.

To reduce the possibility of the hull skin tearing away from the frame member and to provide for a more uniform response of the external hull to deformation forces, the present invention provides an intermediate skin secured between the thin hull skin and the thick base skin of the frame members. The invention is illustrated in FIG. 2, wherein a frame member 22, which is triangular in cross-section, has a thick base skin 24, and has extensions 26 extending outwardly from the corner apexes 28 to provide the means whereby the frame member is secured to the skin or plating of the hull. Extensions 26 are formed so as to enable attachment of skin 24 to a section of hull plating material 30 of a thickness which is intermediate to the thickness of base skin 24 and hull skin 32. Extensions 26 are formed with a step or jog 27 adjacent the free end thereof to provide for joinder to intermediate skin 30 by means of a lap joint connection. Likewise, intermediate skin 30 is formed with a step or jog 34 to permit connection to hull skin 32 by means of an overlap joint 36.

Figure 3:
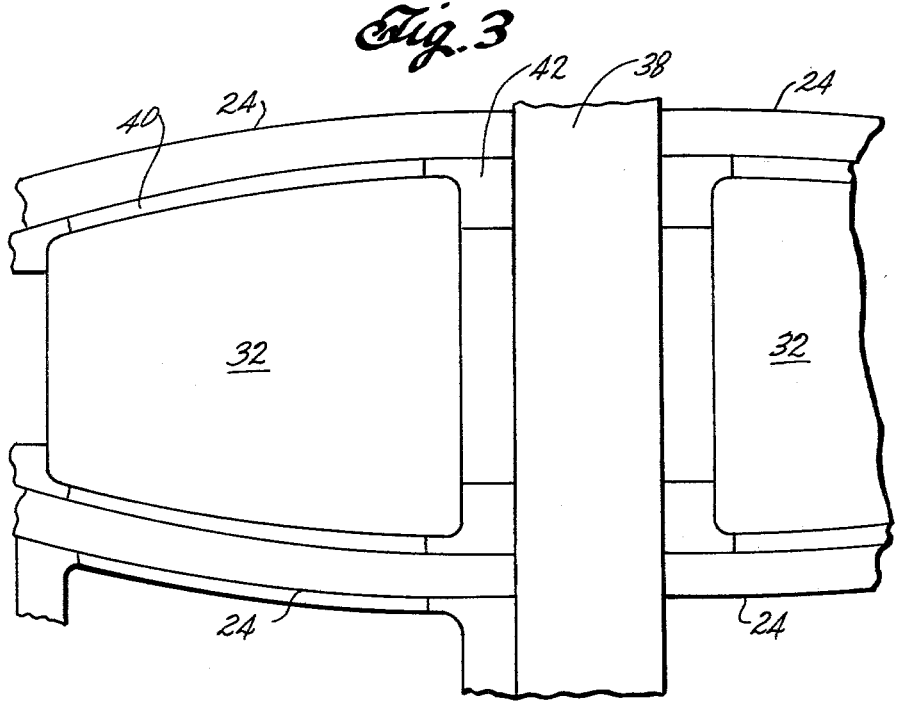
FIG. 3 is a plan view of a portion of the interior of a hull of a metal-clad airship illustrating a specific pattern of external skin construction according to the present invention.

The application of the present invention to actual hull construction is shown in the plan view of FIG. 3. As can be seen therein, the base skin 38 of a primary frame member is shown facing upwardly. The primary frame members are oriented transversely of the longitudinal axis of the hull. The thin hull skin 32 of the airship is preferably of Alclad aluminum alloy having a thickness of approximately 0.0115 to 0.015 inch. The thick base skin 24 of a longeron extends longitudinally of the hull and overlies the base skin 38 of the primary frame member.

As is seen in FIG. 3, a number of discrete skin sections are provided intermediate the hull skin 32 and the frame and longeron base skins 38, 24. Such base skins are preferably two to three times thicker than the hull skin 32. These intermediate sections are in the form of elongated strips 40 and corner pieces 42. The corner pieces are secured to the base skins 24, 38 at the points of intersecting overlap of the longerons and the primary frame members. Corner pieces 42 are provided of a skin thickness intermediate the thickness of skins 38 and 24 and hull skin 32. Likewise, elongated strips 40 are formed of a sheet of metal of a thickness intermediate the thickness of the base skins of the frame members and the hull skin 32. Strips 40 and 42 are secured to hull skin 32 by means of lap joints and are bonded and sealed to provide a gastight construction. Likewise, the sheets or gores of the hull skin 32 are formed in generally four-sided figures, and the corner pieces 42 are secured to the hull skin by means of a lap joint which is riveted and bonded to the corner peripheries of the hull skin.

What has been provided is a hull skin fabricated generally in longitudinally-shaped gores with rounded corners to fit into recessed or jogged seams of the thicker transition sheet strips which are in turn secured to the boundaries of the thick skin of the bases of the structural members, both the transverse frames and the longerons by means of recessed or jogged seams. Metal-clad airships constructed in this manner will be highly precise in form. The gores and all sheet metal bases will have have compound curvature imparted to them by means of stretch presses. This precision of form will be retained to a still high degree due to the reduction of the differences in radial expansion under internal pressure of the various components of the hull by the use of the above-described gradation of skin thicknesses or gages, particularly ahead and behind each main frame.

What is claimed is:

1. An apparatus for joining rigid transverse and longitudinal structural framing and reinforcing members of a metal clad airship hull, said hull having a rigid skin portion located intermediate said framing and reinforcing members, the framing and reinforcing members having a base portion of a pre-determined thickness greater than the skin portion, said apparatus comprising
at least one intermediate section of rigid hull material of a pre-determined thickness secured between the base portion of the framing and reinforcing members and the rigid skin portion, the thickness of the intermediate section being such that it is intermediate the thickness of the framing and reinforcing members base portion and that of the rigid skin portion whereby deformation or discontinuity in the curvature of the airship hull due to changes in pressurization is prevented.

2. An apparatus according to claim 1 wherein the framing and reinforcing members base portion is approximately two to three times thicker than the rigid skin portion.

3. An apparatus according to claim 2 including a plurality of strips of said intermediate thickness material extending between said framing members oriented transversely of the hull and the rigid skin portion.

4. An apparatus according to claim 3 including a plurality of strips of said intermediate thickness material extending between reinforcing members oriented longitudinally of the hull and the rigid skin portion.

5. An apparatus according to claim 4 including a plurality of corner sections of said intermediate thickness material bridging the transverse and longitudinally extending framing and reinforcing members and the rigid skin portion.

* * * * *